W. T. JOHNSON.
RAIL JOINT.
APPLICATION FILED OCT. 7, 1913. RENEWED AUG. 3, 1915.
1,243,070.
Patented Oct. 16, 1917.
2 SHEETS—SHEET 1.
Fig. 1
Fig. 2
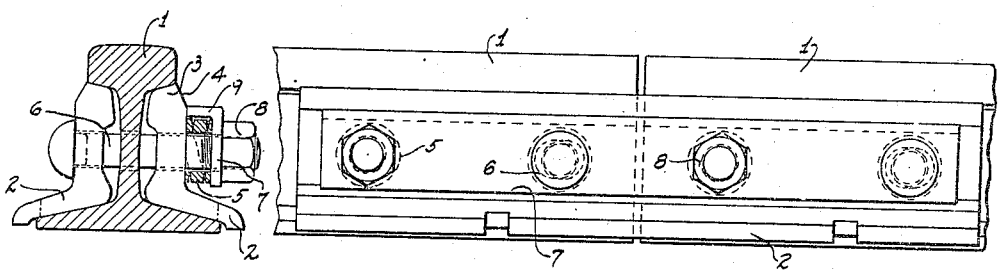
Fig. 3
Fig. 4
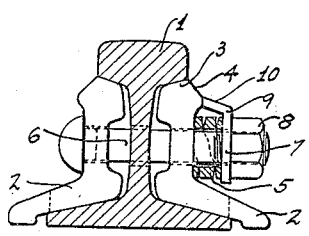   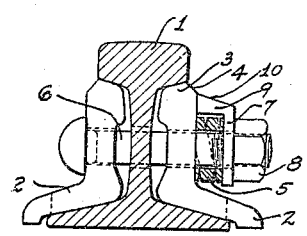
Fig. 5
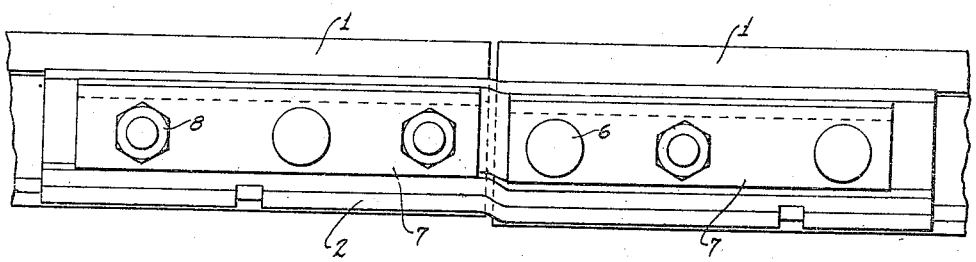
Witnesses:
Edward W. Schoenfeld
Geo. V. James
Inventor
Walter T. Johnson
By his Attorney
W. S. Orton.

W. T. JOHNSON.
RAIL JOINT.
APPLICATION FILED OCT. 7, 1913. RENEWED AUG. 3, 1915.
1,243,070.
Patented Oct. 16, 1917.
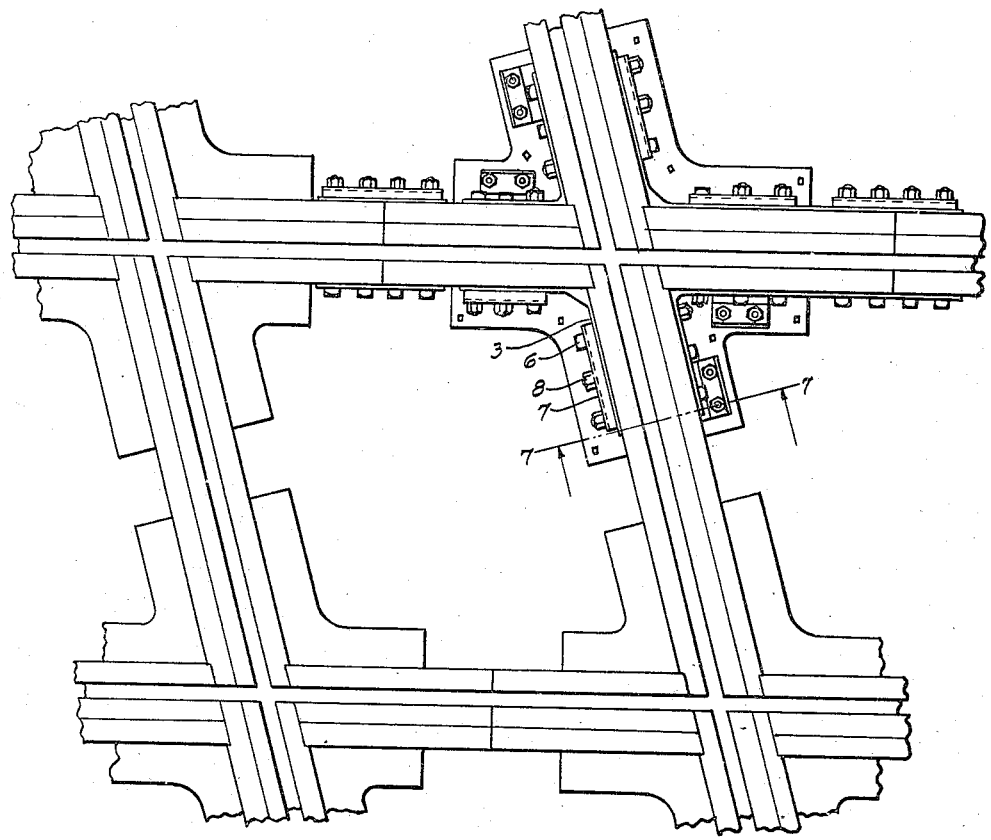
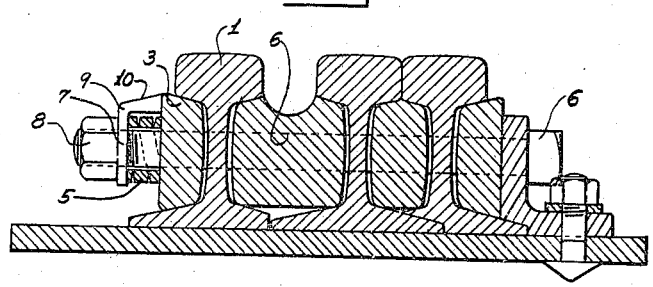

UNITED STATES PATENT OFFICE.

WALTER T. JOHNSON, OF MACON, GEORGIA.

RAIL-JOINT.

1,243,070.  Specification of Letters Patent.  Patented Oct. 16, 1917.

Application filed October 7, 1913, Serial No. 793,816. Renewed August 3, 1915. Serial No. 43,454.

*To all whom it may concern:*

Be it known that I, WALTER T. JOHNSON, a citizen of the United States, and a resident of the city of Macon, county of Bibb, and State of Georgia, have invented certain new and useful Improvements in Rail-Joints, of which the following is a specification.

My invention relates to a rail joint, particularly of that class of joints in which the splice bars are held to the rails by means of a tensioning device.

It is usual in devices of this character to pass bolts through the splice bars and rails and to position a coiled spring about one or more of the bolts with the opposite ends thereof bearing on the adjacent splice bar and on the bolt head or nut. Sometimes one or more bolts are connected by means of a plate which acts as a bearing for the springs and as a washer for the nuts to prevent them from threading off the bolts during service.

It has been found that the operativeness of these springs depends largely upon their freedom from ballast and other foreign matter which might sift down between the coils, and accordingly an object of my invention is to provide a simple form of housing to protect these springs.

It has been suggested to extend the upper portion of the splice bar outward to form an overhanging protecting ledge for the spring, but under some conditions this gives rise to objectionable features especially where the spring is positioned on the inside of the rail. In those cases where the splice bars are irregular in width, as on the forged angular splicings at crossings, it is inconvenient if not impossible to form a closed housing for the spring by thus extending the splice bar.

In my improved joint, I use a conventional form of splice bar, the shape and disposition of the metal of which is controlled by the requirements of stresses due to its function as a splice bar and to protect the spring I provide an extension in the relatively light and inexpensive connecting plate carried by the bolts as a vibration plate.

Another object of my invention is to provide a spring housing which may be used at crossings and at step joints where any head to the splice bar is usually omitted thus leaving the spring entirely unprotected at the very places where spring protection is most desired.

A further object is to provide a housing which will afford a ready access to the spring to oil, inspect and replace the same.

Various other objects and advantages will be in part obvious and in part more fully set forth in the following description of a preferred form of my invention which also includes certain novel features of construction and combination of parts hereinafter set forth and claimed.

Referring to the drawings:—

Figure 1 is an end elevation of one form of my invention applied to the rail joint and showing one of the rails in section.

Fig. 2 is a side elevation of the device shown in Fig. 1.

Fig. 3 is a view similar to Fig. 1, but showing a slightly modified form of the invention.

Fig. 4 is still another form, particularly applicable to step joints.

Fig. 5 is a side elevation of the device shown in Fig. 4.

Fig. 6 is a plan view of a crossing showing my improvement in position thereon, and Fig. 7 is a vertical transverse section through one end of the joint at a crossing and taken on the line 7—7 of Fig. 6.

In the drawings are shown the adjacent ends of rails 1 of conventional form and which in Fig. 5 are shown to be of different weights to form a step joint. The ends of the rails are lapped on opposite sides by splice bars 2, which preferably have a rail head engaging portion 3, the upper surface 4 of which extends beyond the rail head and is inclined outward and downward.

One or both of the splice bars are held in engagement with the rails by means of a coiled spring 5 carried by shouldered bolts 6 passing through the bars and rails as is usual with devices of this character. Further following a known structure, there is a spring bearing plate 7, disposed between one of the shoulders of the bolt, such as the nut 8, and the adjacent ends of the springs, which plate may be carried by one or more bolts and may extend across the joint, if desired. This plate has an extension 9 preferably integral therewith, overlapping the spring and bodily movable relative to the splice bar so that as the bolt is tightened and the spring compressed, the extension can move toward the bar and the width of this extension can be so proportioned that it will just touch the bar when the spring has been compressed to its limit.

These plates are preferably commercially rolled angle bars, but as they are not subjected to any severe strains, may be made of some light flexible material which may be fastened to the bolts and then bent over close to the spring, in which case, even should the extension bear on the splice bar, the resiliency of this extension would ordinarily be sufficient to prevent any material binding of the spring. This light metal can be easily cut to inclose any particular spring irrespective of the length or the adjustment of the same.

The upper surface 10 of the bearing plate or its extension 9, may be downwardly and outwardly inclined and may form in effect a continuation of the inclined surface 4 of the splice bar, whereby objects falling on the splice bar or plate will tend to slide off the same and clear the bolt heads or nuts, thus minimizing the possibility of shearing the fastening parts of the joints.

By means of this construction an inexpensive and simple form of spring housing is provided which can fit any of the usual forms of splice bars and provides an effective device for use at rail crossings and other places where the spring is usually exposed. This housing may be made of low grade and light material as it is not intended to resist strains; it may be conveniently rolled or flanged to the desired shape and size and its installation will in no way affect the attached parts or their functions. Further this form of construction provides an economical advantage over the suggested device in which an extension from the splice bar itself partially or wholly houses the spring, in that there is a saving of a large amount of high grade material in the splice bar.

In making the plate 7 of an angled construction there is acquired for a device of this character all the advantages of an angle bar to resist lateral strains. The extension 9 which projects toward the splice bar or rails may be utilized as a gage in tightening up the bolts to equalize the tension on the several springs and thus provide for a uniform pressure of the splice bar against the rails throughout the length of the splice bars.

Whatever opening may be formed between the splice bar and the spring protecting member is positioned relatively close to the rail head and thus above the ballast while the members adjacent the outer end of the spring can be firmly embedded in the ballast as usual.

Although I have shown one form of mechanism embodying my invention, it is obvious that various changes within the skill of the mechanic may be made therein without departing from the spirit of the invention, provided the means set forth in the following claims are employed.

Having thus described my invention, I claim :—

1. In a rail joint, the combination with a splice bar, of a bolt extending through said bar, a coiled spring on said bolt and having one end bearing on said bar, an angle bar having one flange forming a freely movable bearing for the other end of said spring and the other flange overlapping said spring to protect the same, the overlapping portion of said flange having a width to reach to the splice bar when the spring is compressed to its limit.

2. In a rail joint construction, the combination with two rails having adjacent ends disposed in juxtaposition to form the rail joint, of a splice bar lapping the adjacent ends, spaced bolts connecting said bar with said rails, a housing plate carried by said bolts, and bodily movable relative to said rails, a spring bearing on said plate and said bar, said plate having an overhanging ledge covering said spring to protect the same.

3. In a rail joint construction, the combination with a rail and a splice bar, of a shouldered bolt connecting said rail and bar, a spring carried by said bolt and acting on said bar and rail to draw the same together, a spring bearing disposed between the spring and a shoulder of said bolt, said bearing having an extension partially inclosing said spring.

4. In combination with a rail, of a splice bar having an upper surface extending beyond and downwardly inclined from the rail head, a spring housing plate having a downwardly inclined upper surface extending beyond and forming substantially a continuation of the inclined upper surface of the splice bar whereby objects falling on said bar or plate tend to slide off the same.

5. In a rail joint construction, the combination of two rails having adjacent ends disposed in juxtaposition to form the rail joint, of a splice bar lapping the adjacent ends, springs for connecting said bar with said rails, and a protecting plate disposed to the outside of and overlapping parts of said springs.

6. In a rail-joint construction, the combination of two rails having adjacent ends disposed in juxtaposition to form a rail-joint, of a splice bar lapping the joint, springs for connecting said bar and rails, and means independent of the splice bar so as to be movable relative thereto and overlapping said last named connecting springs to protect the same.

7. In a rail-joint construction, the combination of two rails having adjacent ends disposed in juxtaposition to form a rail-joint, means for connecting said rails across the joint, said means including springs and a construction for housing said springs.

8. In a rail-joint construction, the combination including a rail having a fastening means including compression springs extending transversely therethrough and means supported by and having a portion thereof spaced from and overhanging said fastening means for protecting the same.

9. In a rail joint, the combination with a splice bar and fastening means engaging said bar, said fastening means including a metallic resilient member, of a protecting member for said resilient member, said protecting member provided with a bearing face for engaging the splice bar above the resilient member.

10. In a rail joint, the combination with a splice bar and fastening means engaging said bar, said fastening means including a resilient member in the form of a coiled metal spring, of a protecting member for said resilient member, said protecting member provided with a bearing face for engaging the splice bar above the resilient member, and means forming part of the fastening means for forcing said bearing face into engagement with said splice bar.

In witness whereof I have hereunto set my hand in the presence of two witnesses.

WALTER T. JOHNSON.

Witnesses:
 FAIRLIE CULBEDGE,
 DAVENPORT GUERRY.

Copies of this patent may be obtained for five cents each, by addressing the "Commissioner of Patents, Washington, D. C."